United States Patent
Vagni

(10) Patent No.: US 11,235,642 B2
(45) Date of Patent: Feb. 1, 2022

(54) AERODYNAMIC DEVICE AND MOTOR VEHICLE

(71) Applicant: FORD GLOBAL TECHNOLOGIES, LLC, Dearborn, MI (US)

(72) Inventor: Alejandro Cristian Vagni, Frankfurt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 430 days.

(21) Appl. No.: 16/238,325

(22) Filed: Jan. 2, 2019

(65) Prior Publication Data

US 2019/0202264 A1    Jul. 4, 2019

(30) Foreign Application Priority Data

Jan. 2, 2018  (DE) .......................... 102018200006.9

(51) Int. Cl.
  *B60H 1/24*    (2006.01)
  *B60S 1/54*    (2006.01)
  *B60J 1/20*    (2006.01)

(52) U.S. Cl.
  CPC ............. *B60H 1/244* (2013.01); *B60H 1/242* (2013.01); *B60J 1/20* (2013.01); *B60S 1/54* (2013.01)

(58) Field of Classification Search
  CPC ...... B60H 1/242; B60H 1/244; B60H 1/3457; B60S 1/54; B60S 1/586; B60J 1/2002; B60J 1/2008; B60J 1/20; B62D 35/00; B62D 35/001
  USPC ....................................................... 454/127
  See application file for complete search history.

(56) References Cited

U.S. PATENT DOCUMENTS

| | | | |
|---|---|---|---|
| 2,096,901 A | | 4/1937 | Knecht |
| 3,828,456 A | * | 8/1974 | Rose ..................... G09F 21/042 40/592 |
| 4,109,562 A | | 8/1978 | MacDonald |
| 5,150,098 A | * | 9/1992 | Rakow ................... B60Q 1/444 340/464 |
| 5,648,756 A | * | 7/1997 | Zadok ................... B60Q 1/302 340/464 |
| 6,089,971 A | | 7/2000 | Jokela et al. |
| 6,394,890 B1 | | 5/2002 | Merkel |

(Continued)

FOREIGN PATENT DOCUMENTS

| | | |
|---|---|---|
| CA | 1102373 A | 6/1981 |
| DE | 930724 C | 7/1955 |

(Continued)

OTHER PUBLICATIONS

English Machine Translation of DE1218297B dated Jun. 2, 1966.

(Continued)

*Primary Examiner* — Avinash A Savani
*Assistant Examiner* — Dana K Tighe
(74) *Attorney, Agent, or Firm* — David Coppiellie; Price Heneveld LLP

(57) ABSTRACT

A motor vehicle having an interior compartment which is at least partially enclosed by windows is provided. At least one windshield or one side window or one rear window is assigned an aerodynamic device which is designed to, when an air flow impinges on the aerodynamic device, generate turbulence at a surface, facing toward the interior compartment, of the window. The aerodynamic device is also provided.

12 Claims, 2 Drawing Sheets

(56) References Cited

U.S. PATENT DOCUMENTS

| | | | |
|---|---|---|---|
| 6,427,760 B2* | 8/2002 | Klinger | B60H 1/00064 165/42 |
| 7,659,808 B1* | 2/2010 | Cooper | B60Q 1/503 340/425.5 |
| 9,821,864 B2* | 11/2017 | Watanabe | B62D 35/02 |
| 10,102,781 B1* | 10/2018 | Mitchell | G09F 13/04 |
| 2005/0083183 A1* | 4/2005 | Cao | B60Q 1/268 340/426.13 |
| 2007/0120757 A1* | 5/2007 | Ogino | H01Q 7/00 343/713 |
| 2008/0121046 A1* | 5/2008 | Glezer | A61M 1/3675 73/861.24 |
| 2012/0282105 A1* | 11/2012 | Grife | F03D 1/0675 416/228 |
| 2015/0010407 A1 | 1/2015 | Rodriguez et al. | |
| 2016/0229540 A1 | 8/2016 | Loukisa | |
| 2016/0272302 A1* | 9/2016 | Rosenberger | B64C 23/065 |

FOREIGN PATENT DOCUMENTS

| | | |
|---|---|---|
| DE | 1218297 B | 6/1966 |
| DE | 1680288 B2 | 2/1976 |
| DE | 19755593 A1 | 6/1999 |
| DE | 602004001725 T2 | 8/2007 |
| EP | 2681079 B1 | 6/2015 |
| JP | 2017065426 A | 4/2017 |

OTHER PUBLICATIONS

English Machine Translation of EP268107B1 dated Jun. 17, 2015.
English Machine Translation of JP2017065426A dated Apr. 6, 2017.
English Machine Translation of DE930724C dated Jul. 21, 1955.
English Machine Translation of DE602004001725T2 dated Aug. 2, 2007.
English Machine Translation of DE19755593A1 dated Jun. 7, 1999.
English Machine Translation of DE1680288B2 dated Feb. 26, 1976.
Search Report dated Dec. 19, 2018 for DE Application No. 102018200007.7 filed Jan. 2, 2018.
Search Report dated Dec. 19, 2018 for DE Application No. 102018200006.9 filed Jan. 2, 2018.
English Machine Translation of FR2972156A21 dated Sep. 7, 2012.

\* cited by examiner

AERODYNAMIC DEVICE AND MOTOR VEHICLE

TECHNICAL FIELD

This document relates to an aerodynamic device and to a motor vehicle having said aerodynamic device, the motor vehicle having an interior compartment which is at least partially enclosed by windows.

BACKGROUND

U.S. Pat. No. 6,394,890 B1 has disclosed a deicing deflector which is formed from an elongate flexible channel which is arranged on the inner side of a windshield close to an upper edge. The channel is an inverted U-shaped profile with an outer, an upper and an inner wall. The outer wall comprises an adhesive surface with a peelable cover which is peeled off immediately before application to the windshield. The channel is composed of a flexible material, such as in particular neoprene, polyurethane or rubber, which can be bent and pulled and, in the process, maintains its U shape.

SUMMARY

It is an object of this document to provide a motor vehicle having an improved arrangement for aerating the windows.

Said object is achieved by means of a motor vehicle and aerodynamic device as set forth in the following claims.

The motor vehicle has an interior compartment which is at least partially enclosed by windows. At least one windshield or one side window or one rear window is assigned an aerodynamic device which is designed to, when an air flow impinges on the aerodynamic device, generate turbulence at a surface, facing toward the interior compartment, of the window.

The aerodynamic device generates small vortices in the boundary layer with respect to the window. The window can thus be more quickly demisted, and thus the view through the window can be improved. The faster demisting or thawing of the window offers an increase in safety and comfort for the passengers.

In an advantageous embodiment of the motor vehicle, the window is the rear window.

The rear window in particular remains misted up for longest in conventional motor vehicles. The benefit of the aerodynamic device is thus at its greatest at the rear window.

In an alternative advantageous embodiment of the motor vehicle, the window is the side window or a windshield. Demisting and a clear view are thus also realized more quickly at the other windows.

In a further advantageous embodiment of the motor vehicle, the aerodynamic device is arranged on a surface, facing toward the interior compartment, of the window. This arrangement is advantageous in particular for a retrofit solution, because the aerodynamic device can be easily attached to the window.

In a further advantageous embodiment of the motor vehicle, the aerodynamic device does not make contact with the window. Thus, the aerodynamic device can be arranged in the interior compartment in an unobtrusive and aesthetically more appealing manner than in the case of an adhesively bonded variant.

In a further advantageous embodiment of the motor vehicle, the aerodynamic device is transparent. Thus, the view through said aerodynamic device, in particular in the adhesively bonded variant, is ensured, and the field of view is not impaired. In the transparent or translucent design, the aerodynamic device may under some circumstances be designed to be larger, and thus more effective, without obstructing the view.

In a further advantageous embodiment of the motor vehicle, the window has a heating wire. The effect of the aerodynamic device is thus further assisted.

In a further advantageous embodiment of the motor vehicle, this comprises at least one air vent which is arranged in the interior compartment and which is designed to generate an air flow in the direction of the at least one aerodynamic device. The impingement of flow on the aerodynamic device can thus be effected in a more targeted manner.

In a further advantageous embodiment of the motor vehicle, the motor vehicle is a sedan. The rear window of sedans in particular is affected by the misting problem. The arrangement of at least one aerodynamic device can solve this problem.

The aerodynamic device is designed for an interior compartment, which is at least partially enclosed by windows, of a motor vehicle. Here, the aerodynamic device is designed to generate turbulence downstream of the aerodynamic device when an air flow impinges on the aerodynamic device. Thus, a device is provided which can be used in a motor vehicle and which assists in more quickly demisting a window to which the aerodynamic device is assigned.

BRIEF DESCRIPTION OF THE DRAWING FIGURES

Further advantages will emerge from the more detailed description and from the figures. The motor vehicle and aerodynamic device will be discussed in more detail on the basis of the figures and the following description.

Figure 1:
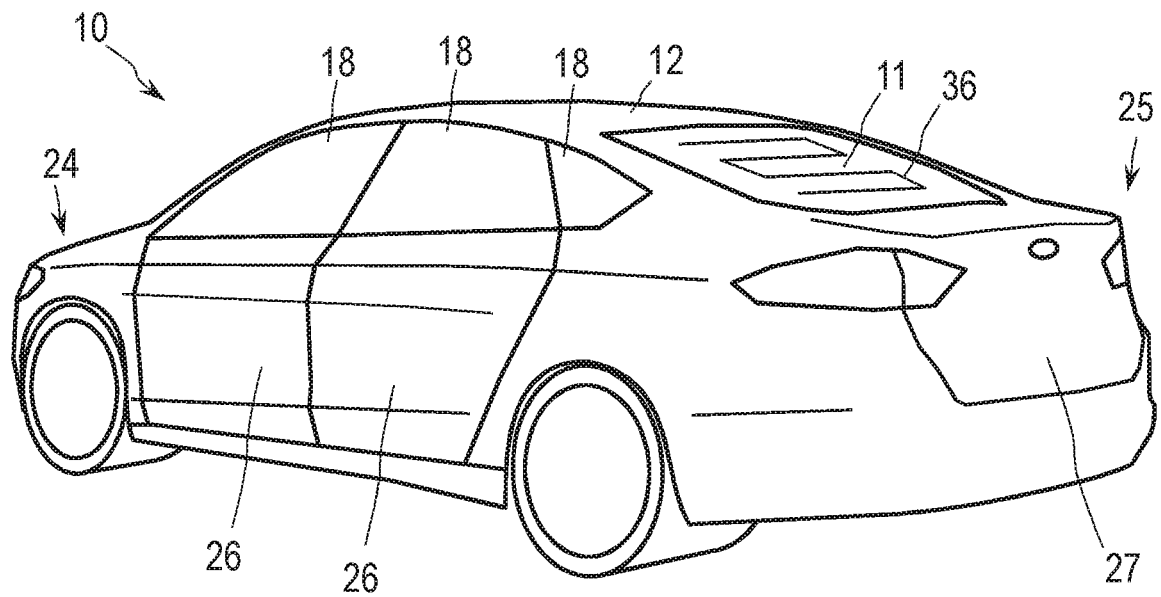
FIG. 1 shows a new and improved motor vehicle in an exemplary embodiment.
Figure 2:
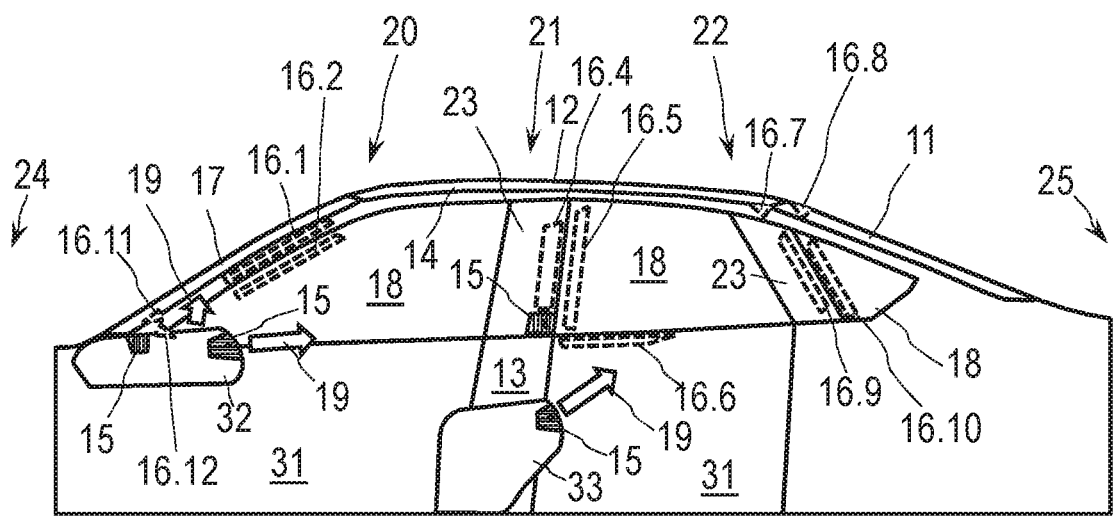
FIG. 2 shows an interior compartment of the motor vehicle in an exemplary embodiment.

FIGS. 1 and 2 illustrate the new and improved motor vehicle 10 in an exemplary embodiment in different views. FIG. 1 shows the exemplary motor vehicle 10 from the outside in a view from the rear, and FIG. 2 shows the exemplary motor vehicle 10 in a sectional illustration. The motor vehicle 10 is in particular in the form of a sedan (notchback). This situation is illustrated in FIGS. 1 and 2. The motor vehicle 10 may alternatively be in the form of a station wagon, fastback, hatchback or squareback. In the exemplary embodiment, the motor vehicle 10 has at least one side door 26 and a tailgate 27.

As is conventional, the motor vehicle 10 has a front 24 and a rear 25. During forward travel, the motor vehicle 10 moves in the direction of the front 24.

As is likewise conventional, the motor vehicle 10 has an interior compartment 13 for accommodating at least one passenger, who may also be a driver of the motor vehicle 10. The interior compartment 13 is schematically shown in an exemplary embodiment in a sectional illustration in FIG. 2.

The interior compartment 13 is at least partially surrounded by windows 11, 17, 18. Accordingly, the motor vehicle 10 has a windshield 17, at least one side window 18 and a rear window 11. The at least one side window 18 is in particular arranged in the at least one door 26. The rear window 11 may be arranged in the tailgate 27 or outside the tailgate 27.

The motor vehicle 10 furthermore has a roof 12, which may also be of tiltable and/or foldable design.

The motor vehicle 10 has at least one A pillar 20, and the motor vehicle 10 may furthermore have a B pillar 21 and/or a C pillar 22. In the exemplary embodiment as a sedan, the motor vehicle 10 consequently has the A pillar 20, the B pillar 21 and the C pillar 22, wherein a side window 18 is arranged in the C pillar 22.

Figure 3:
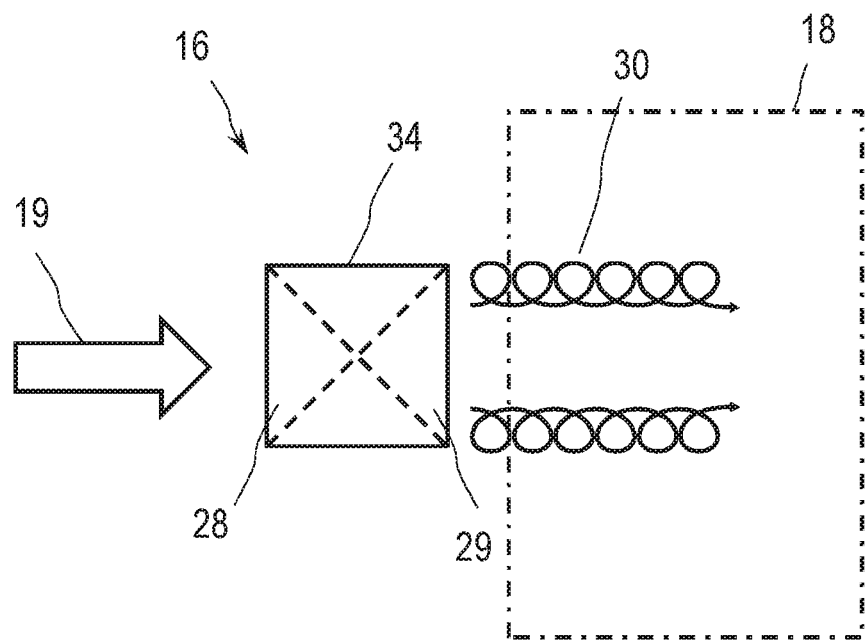
FIG. 3 shows from above a new and improved aerodynamic device in an exemplary embodiment.

The motor vehicle 10 comprises at least one aerodynamic device 16, which is assigned to the windshield 17 and/or to the at least one side window 18 and/or to the rear window 11. It is preferable for the at least one aerodynamic device 16 to be assigned to in each case one of the windows 11, 17, 18. At least one of the windows 11, 17, 18 may also be assigned multiple aerodynamic devices 16, arranged in particular in a row. The windshield 17 or the side window 18 or the rear window 11 to which the at least one aerodynamic device 16 is assigned furthermore comprises, in particular, a heating wire 36. The aerodynamic device 16 according to the invention is schematically illustrated in an exemplary embodiment in a functional diagram in FIG. 3.

The aerodynamic device 16 is designed to generate a turbulent flow 30 downstream of the aerodynamic device 16 when a flow is incident thereon, that is to say when an air flow 19 impinges on the aerodynamic device 16. The aerodynamic device 16 is a turbulator or a vortex generator. In particular, the aerodynamic device 16 is designed to generate turbulence 30 comprising eddy currents, in particular small eddy currents. The aerodynamic device 16 is designed such that the turbulence 30 is generated at a surface, facing toward the interior compartment 13, of the window 11, 17, 18, in particular in an aerodynamic boundary layer at the surface of the window 11, 17, 18.

For this purpose, the aerodynamic device 16 comprises, in particular, an incident-flow region 28 which is designed for an air flow 19 to be incident thereon. The air flow 19 may in this case be in particular a laminar flow, or a turbulent flow. Furthermore, the aerodynamic device 16 comprises in particular a flow-off region 29, which is designed to generate turbulence 30 downstream of the flow-off region 29.

The aerodynamic device has for example the shape of at least one pyramid. The pyramid in this case preferably has a square base 34 and a height which corresponds approximately to half of the length of one side of the base. This form has proven to be particularly advantageous with regard to effectiveness, production and aesthetics. In particular, the pyramid has a side surface of 12 mm and a height of 7 mm.

In order that said turbulence 30 occurs at an interior surface, facing toward the interior compartment 13 of the motor vehicle 10, of the window 11, 17, 18 to which the aerodynamic device 16 is assigned, the aerodynamic device 16 is arranged upstream of at least one region of the window 11, 17, 18. The possible positions at which the at least one aerodynamic device 16 is arranged in the interior compartment 13 are illustrated by way of example simultaneously in FIG. 2. The at least one aerodynamic device 16 is therefore illustrated as a dashed line in FIG. 2.

The aerodynamic device 16 may be arranged in the motor vehicle 10 on that surface of the side window 18 or windshield 17 or rear window 11 which faces toward the interior compartment 13. In particular, the aerodynamic device 16 is in this case of transparent, in particular translucent, form. Here, the aerodynamic device 16 is attached, in particular adhesively bonded, to the window 11, 17, 18 in particular in a front region. The front region of the window 11, 17, 18 is defined here as being closer than a rear region of the window 11, 17, 18 to the front 24 of the motor vehicle 10.

In FIG. 2, the positions 16.2, 16.5, 16.8, 16.10 and 16.11 show positions at which the aerodynamic device 16 is mounted in each case on the window 11, 17, 18. Here, the aerodynamic device 16 is, in the position 16.2, attached to the front side window 18. In the position 16.5, the aerodynamic device 16 is attached to the rear side window 18. In the position 16.8, the aerodynamic device 16 is attached to the rear window 11. In the position 16.10, the aerodynamic device 16 is attached to the rear side window 18 arranged in the C pillar 22. In the position 16.11, the aerodynamic device 16 is attached to the windshield 17. Here, the position 16.2 is close to the A pillar 20. The position 16.5 is close to the B pillar 21, and the position 16.10 is in the C pillar.

As an alternative to the arrangement on the window 11, 17, 18, the aerodynamic device 16 may be arranged in the motor vehicle adjacent to the windshield 17 or to the side window 18 or to the rear window 11, in particular such that the aerodynamic device 16 does not make contact with the respective window 11, 17, 18. Here, the at least one aerodynamic device 16 is preferably arranged on a paneling part, or integrated into a paneling part.

If the at least one aerodynamic device 16 is assigned to the windshield 17, the paneling part is in particular a dashboard 32. This situation is illustrated in FIG. 2 at the position 16.12.

If the at least one aerodynamic device 16 is assigned to the rear window 11, the paneling part is in particular a roof lining 14. This situation is illustrated in FIG. 2 at the position 16.7. Alternatively, if the aerodynamic device 16 is assigned to the rear window 11, the paneling part is in particular a brake lamp. Here, the aerodynamic device 16 is in particular, in the direction of the rear 25 of the motor vehicle 10, arranged in front of the rear window 11.

If the at least one aerodynamic device 16 is assigned to the at least one side window 18, the paneling part is in particular a side paneling part 23. This situation is illustrated in FIG. 2 at the positions 16.1, 16.4 and 16.9. Here, the aerodynamic device 16 is in particular, in the direction of the rear 25 of the motor vehicle 10, arranged in each case in front of the side window 18.

It is alternatively possible, if the at least one aerodynamic device 16 is assigned to the at least one side window 18, for the paneling part to be in particular a door paneling part 31. This situation is illustrated in FIG. 2 at the position 16.6, wherein the aerodynamic device 16 is arranged in each case below the side window 18.

The motor vehicle 10 comprises, in particular, at least one air vent 15. The air vent 15 is designed to generate an air flow 19. Here, the at least one air vent 15 is arranged in the motor vehicle 10 such that the air flow 19 reaches the at least one aerodynamic device 16. In the exemplary embodiment shown, the motor vehicle 10 has multiple air vents 15. Accordingly, the air vent 15 may be arranged in the dashboard 32 and/or in the door paneling part 31 and/or in the side paneling part 23 and/or in a console 33.

Although the motor vehicle and aerodynamic device have been illustrated and described in more detail on the basis of the preferred exemplary embodiments, the motor vehicle and aerodynamic device are not restricted by the disclosed examples, and other variations may be derived therefrom by a person skilled in the art without departing from the scope of protection provided by the following claims.

The figures are not necessarily accurate in all details and true to scale, and may be presented on an enlarged scale or a reduced scale in order to provide a better overview. Therefore, functional details disclosed here are to be understood not as being of a limiting nature but rather merely as an illustrative basis that provides a person skilled in the art in this technological field with guidance for using the present invention in a versatile manner.

The expression "and/or" used here, where used in a series of two or more elements, means that each of the stated elements may be used individually, or any combination of two or more of the stated elements may be used. For example, if a configuration is described which comprises the components A, B and/or C, the configuration may comprise A on its own; B on its own; C on its own; A and B in combination; A and C in combination; B and C in combination; or A, B and C in combination.

What is claimed:

1. A motor vehicle comprising;
an interior compartment at least partially enclosed by a window, wherein the window is assigned an aerodynamic device including a body having (a) an incident-flow region and (b) a flow-off region, wherein said flow-off region faces toward an interior surface of the window and is adapted to generate turbulence in an air flow impinging upon the aerodynamic device, wherein the aerodynamic device, including the incident-flow region and the flow-off
region, is transparent, and wherein the body of the aerodynamic device is pyramid shaped and the turbulence comprises a plurality of eddy currents; and
at least one air vent arranged in the interior compartment that generates the air flow in a direction of the aerodynamic device.

2. The motor vehicle as claimed in claim 1, wherein the window is a rear window.

3. The motor vehicle as claimed in claim 1, wherein the window is a side window.

4. The motor vehicle as claimed in claim 1, wherein the window is a windshield.

5. The motor vehicle as claimed in claim 1, wherein the aerodynamic device is arranged on the interior surface of the window.

6. The motor vehicle as claimed in claim 1, wherein the aerodynamic device is free of the window.

7. The motor vehicle as claimed in claim 1, wherein the window includes a heating wire.

8. The motor vehicle as claimed in claim 1, wherein the aerodynamic device has a shape of at least one pyramid.

9. The motor vehicle as claimed in claim 1, wherein the motor vehicle is a sedan.

10. The motor vehicle as claimed in claim 1, wherein the pyramid shape comprises a square base having a length along a side of the square base and a height, and wherein the height is generally half of the length along the side of the square base.

11. An aerodynamic device arranged in an interior compartment of a motor vehicle, the motor vehicle at least partially enclosed by a plurality of windows and has at least one air vent arranged in the interior compartment that generates an air flow in a direction of the aerodynamic device, the aerodynamic device comprising: a transparent body including an incident-flow region and a flow-off region, said flow-off region facing toward an interior surface of a window of the plurality of windows, wherein the transparent body has a shape of at least one pyramid and generates turbulence downstream from the flow-off region in the air flow impinging the incident-flow region of the transparent body, wherein the turbulence comprises a plurality of eddy currents.

12. The aerodynamic device as claimed in claim 11, wherein the pyramid shape comprises a square base having a length along a side of the square base and a height, and wherein the height is generally half of the length along the side of the square base.

* * * * *